Jan. 3, 1928.

L. A. SMITH ET AL 1,654,842

ELECTRIC HEATING DEVICE

Filed May 14, 1927

INVENTORS
L. A. Smith & R. Rzeminiecki
BY L. N. Gillis
ATTORNEY

Jan. 3, 1928.  
L. A. SMITH ET AL  
1,654,842  
ELECTRIC HEATING DEVICE  
Filed May 14, 1927  
2 Sheets-Sheet 2

INVENTORS  
L. A. Smith & R. Rzeminiecki  
BY L. N. Gillis  
ATTORNEY

Patented Jan. 3, 1928.

1,654,842

UNITED STATES PATENT OFFICE.

LEON A. SMITH AND RUDOLF RZEMINIECKI, OF WASHINGTON, DISTRICT OF COLUMBIA.

ELECTRIC HEATING DEVICE.

Application filed May 14, 1927. Serial No. 191,357.

This invention relates to electric heating devices and has special reference to an improved electric heating device for use in boilers, bath tubs, steam generating apparatus such as locomotive and other steam boilers, and for use in heating water in pans, buckets and other receptacles as well as for use as a heating unit in stoves and the like.

One important object of the invention is to improve the general construction of devices of this character.

A second important object of the invention is to provide an improved device of this character in which special provision will be made for maintaining the resistance element out of contact with all metal parts so as to prevent short-circuiting, electric shocks and other injurious results.

A third important object of the invention is to provide an improved device of this character so constructed that no water or other liquid in which the device is emerged can reach the resistance element used in heating.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a longitudinal median section taken through the device and showing a slightly modified form adapted for direct immersion in liquids as in bath tubs, dish pans and the like.

Figure 1:
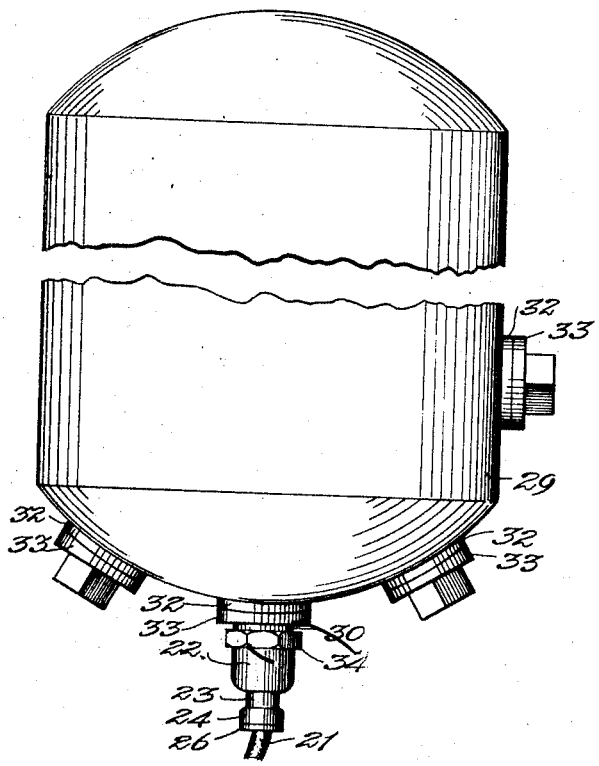
Figure 1 is a view of a water heating boiler showing the manner of applying the invention thereto, provision being made whereby a number of the heating elements may be used at different points and the central portion of the boiler being broken away to show the remainder to a larger scale.

In the forms of the invention shown in Figures 1 to 4 there is provided an outer shell 10 of thin metal and of tubular form, the shell being rounded and closed at one end as at 11 and provided at its remaining end with a thickened portion 12. The shell at this end is open and the mouth is interiorly threaded so that a plug 13 of insulating material may be screwed into this threaded mouth, the flange 14 of this plug fitting tightly against the lower end of the shell. Extending centrally of the shell from the plug 13 and preferably formed integral therewith is a tubular support 15 for the resistance element. Around this support is spirally wound the coiled resistance element 16 and the wire of this element at one end passes through a suitable opening in the support 15 and down through the center of the support as shown at 17, emerging near the base so that it may be engaged by the inner end of a binding bolt or screw 18. The other end of the resistance element is likewise secured on the inner face of the plug 13 beneath a second binding bolt or screw 19 and to the outer ends of the binding bolts are secured the respective line wires 20 having the usual insulating covering 21. Screwed onto the flange 14, which is threaded at its periphery for this purpose, is a shell 22 having a reduced neck 23 and provided with a packing box 24 wherein is carried packing 25 compressed by a packing gland 26 onto the insulation 21 so that no water can enter the chamber formed within the shell 22 and consequently no water can enter the space within the tube 10.

In order to hold the support 15 centrally of the tube 10 and prevent any possibility of the resistance element 16 coming in contact with the wall of said tube there is provided at spaced points around the tube one or more sets of segmento-spherical recesses 27 wherein are seated balls 28 preferably formed of compressed isinglass or mica and contacting with the inner surface of the tube 10. Thus these balls prevent oscillation of the support 15 and the resistance element 16 cannot come in contact with the tube. Moreover, the balls permit easy withdrawal or replacement of the heating element, as for instance in case the element burns out as sometimes happens, the balls rolling on the inner wall of the tube 10 to permit rotation of the plug 13 in unscrewing and also to permit longitudinal movement of the support and heating element.

Figure 3:
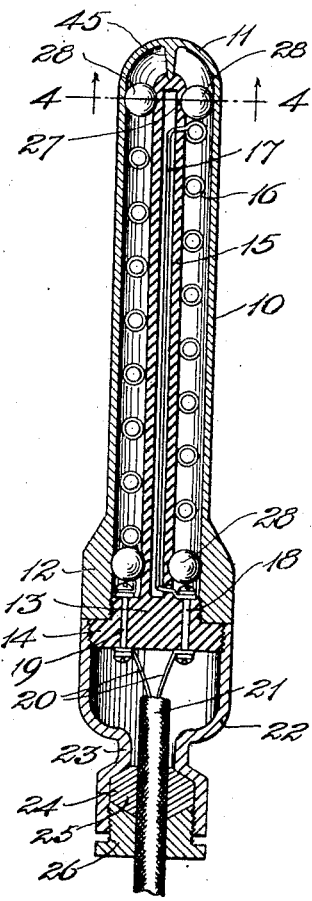
Figure 2:
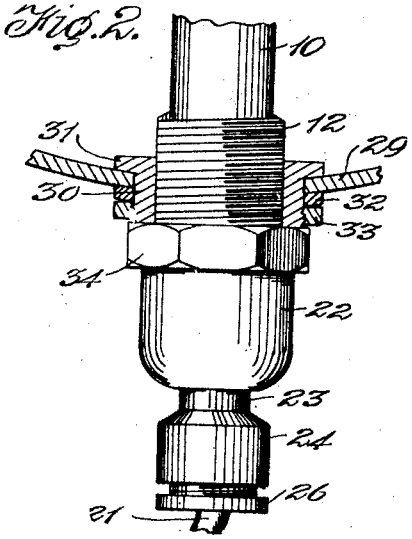
Figure 2 is a section through a portion of the boiler shell showing how the invention is applied thereto.
Figure 4:
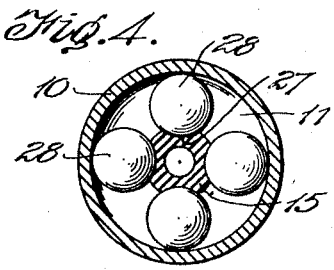
Figure 4 is an enlarged detail section on the line 4—4 of Figure 3.

In the form shown in Figure 3 the exterior of the thickened portion 12 is smooth, this form being adapted for loose immersion in fluid such as in a bath tub or the like. In the form shown in Figure 2 this thickened portion is screw threaded, this form being used for insertion in a heating boiler, a steam boiler such as a stationary or locomotive boiler or any like place where the heating of the fluid is preferably done in a closed vessel. In order to enable the device to be inserted in the boiler without leakage a construction such as shown in Figure 2 may be used wherein the boiler shell is indicated at 29 and fitted in this shell is a sleeve 30 having a flange 31, the sleeve being internally threaded for engagement by the threaded thickened portion 12. The flange 31 rests inside of the boiler shell 29 and fitting over the sleeve and resting against the outer surface is a packing washer 32 of lead or other plastic material which is forced tightly against the shell 29 by a nut 33. Also, on the thickened portion 12 is formed a nut 34 by means of which the device may be screwed into the sleeve 30.

Figure 5:
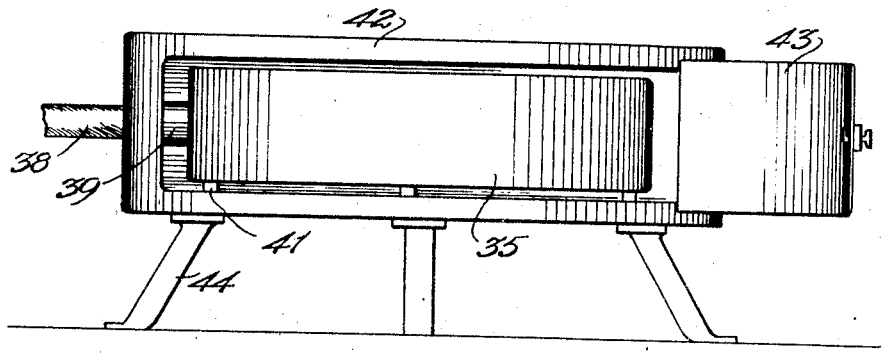
Figure 5 shows a modification of the invention adapted for use in a stove body, this modification being also suitable for use in dish pans and other like places.
Figure 6:
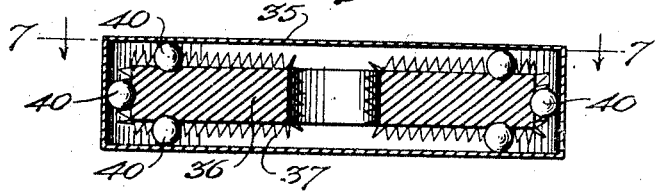
Figure 6 is a diametric section through the modification illustrated in Figure 5.
Figure 7:
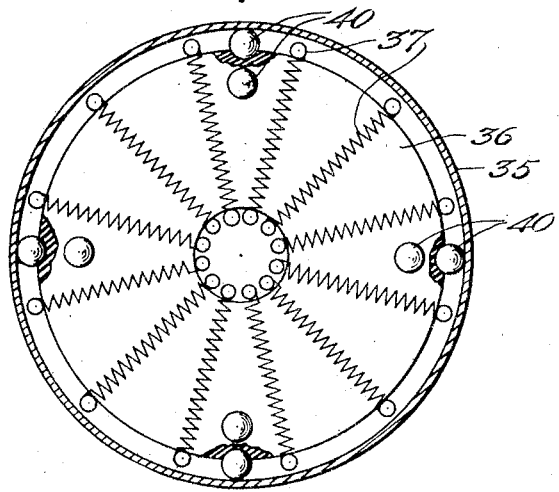
Figure 7 is a section on the line 7—7 of Figure 6.

In the form shown in Figures 5 to 7 in place of the tubular arrangement there is provided a hollow disk like box or casing 35 wherein is located an annular support 36 for a resistance element 37 connected to a cable 38 through a neck 39 of the same construction as the lower or neck portion of the form shown in Figure 3. Balls 40 of like material to the balls 28 are held in suitable depressions in the top, bottom and peripheral faces of the support 36 and serve to keep the element 37 from contacting with the shell 35.

This form of the device may, if desired, have short legs 41 which serve to support the device above the bottom of the dish pan or the like or within a stove casing 42 provided with a door 43 through which the device may be inserted, the casing being mounted on legs 44.

It is to be observed that the sizes and proportions of this device will vary in accordance with the service required and also that the materials of which it is made will be those found best adapted for this service. It is also to be noted that a stop pin 45 may be employed at the upper end of the tube 10 as shown in Figure 3.

It will also be noted that by properly proportioning the threads on the part 12 the device may be used as a stopper for hot water bottles so that it may be placed in such a bottle filled with cold water and the bottle heated and kept hot. In such a case, however, it is preferred that the bottle be equipped with a wire guard to prevent the heating device from coming in contact with the sides of the bottle and injuring the latter or perhaps burning the person using the hot water bottle.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a tubular shell closed at one end and open at the other, a plug of insulating material screwed into said open end, a heating element support extending from the plug centrally of the shell and having ball receiving recesses formed therein, balls seated in said recesses and engaging the shell, a peripheral flange on said plug resting against the shell around the opening, binding posts extending through the plug into the shell, a heating element carried by said support and having its ends connected to the inner ends of said posts, the outer ends of said posts forming means for attaching the wires of a feed cable, and a second shell screwed on the flange and having a packing box through which a cable may pass.

2. In a device of the kind described, a tubular shell closed at one end and open at the other, a plug of insulating material screwed into said open end, a heating element support extending from the plug centrally of the shell and having ball receiving recesses formed therein, balls seated in said recesses and engaging the shell, a peripheral flange on said plug resting against the shell around the opening, binding posts extending through the plug into the shell, a heating element carried by said support and having its ends connected to the inner ends of said posts, the outer ends of said posts forming means for attaching the wires of a feed cable, and a second shell screwed on the flange and having a packing box through which a cable may pass, the open end of the shell being thickened and externally threaded for screwing into a boiler.

In testimony whereof we affix our signatures.

LEON A. SMITH.
RUDOLF RZEMINIECKI.